(12) United States Patent
Choi

(10) Patent No.: US 11,055,749 B1
(45) Date of Patent: Jul. 6, 2021

(54) IN-FEED FRAME TO DISPLAY ADS OR OTHER EXTERNALLY-HOSTED CONTENT

(71) Applicant: Nativo, Inc., El Segundo, CA (US)

(72) Inventor: Justin Yoo Choi, Newport Coast, CA (US)

(73) Assignee: Nativo, Inc., El Segundo, CA (US)

( * ) Notice: Subject to any disclaimer, the term of this patent is extended or adjusted under 35 U.S.C. 154(b) by 779 days.

(21) Appl. No.: 14/974,371

(22) Filed: Dec. 18, 2015

Related U.S. Application Data

(60) Provisional application No. 62/094,406, filed on Dec. 19, 2014.

(51) Int. Cl.
    *G06Q 30/02* (2012.01)
(52) U.S. Cl.
    CPC .................. *G06Q 30/0276* (2013.01)
(58) Field of Classification Search
    CPC ........... G06Q 30/0241; G06Q 30/0277; G06Q 30/0276
    See application file for complete search history.

(56) References Cited

U.S. PATENT DOCUMENTS

| | | | | |
|---|---|---|---|---|
| 7,930,206 B2* | 4/2011 | Koningstein | .......... | G06Q 10/10 705/14.45 |
| 8,165,915 B1* | 4/2012 | Lucash | .................. | G06Q 40/00 705/14.72 |
| 8,694,378 B1* | 4/2014 | Kobyakov | .......... | G06Q 30/0275 705/14.71 |
| 8,989,370 B1* | 3/2015 | Howell | ............... | H04M 3/5158 379/266.07 |
| 2008/0320512 A1* | 12/2008 | Knight | ............. | H04N 21/42653 725/32 |
| 2010/0198697 A1* | 8/2010 | Brown | ............... | G06Q 30/0277 705/14.73 |
| 2011/0099525 A1* | 4/2011 | Krysiuk | ............... | G06F 16/9537 715/849 |
| 2011/0125594 A1* | 5/2011 | Brown | ............... | G06Q 30/0241 705/14.73 |
| 2011/0161990 A1* | 6/2011 | Smith | ..................... | G06F 16/95 719/328 |
| 2011/0231776 A1* | 9/2011 | Wald | ..................... | G06F 16/954 715/738 |
| 2011/0320429 A1* | 12/2011 | Doig | ..................... | G06F 16/972 707/711 |
| 2012/0084641 A1* | 4/2012 | Chung | .................. | G06F 16/972 715/240 |
| 2012/0130807 A1* | 5/2012 | Steelberg | ........... | G06Q 30/0251 705/14.49 |
| 2012/0150665 A1* | 6/2012 | Steelberg | ........... | G06Q 30/0251 705/14.73 |
| 2012/0233235 A1* | 9/2012 | Allaire | ..................... | B01J 6/008 709/201 |

(Continued)

*Primary Examiner* — Azam A Ansari
*Assistant Examiner* — Robert C Johnson
(74) *Attorney, Agent, or Firm* — Van Pelt, Yi & James LLP

(57) ABSTRACT

In-feed encapsulation of display ads or other externally-hosted content is disclosed. In various embodiments, an indication is received that an ad to be displayed in the context of an instance of a publisher content page as rendered at a client system links out to advertising content associated with a third party site. The client system is configured to display a modified version of the advertising content in the event an indication is received that the ad has been selected.

25 Claims, 9 Drawing Sheets

(56) References Cited

U.S. PATENT DOCUMENTS

| | | | |
|---|---|---|---|
| 2012/0239506 A1* | 9/2012 | Saunders | G06Q 30/02 705/14.67 |
| 2013/0132191 A1* | 5/2013 | Galai | G06Q 30/0251 705/14.49 |
| 2014/0189539 A1* | 7/2014 | St. Clair | G06Q 50/01 715/753 |
| 2014/0201615 A1* | 7/2014 | Rajkumar | G06F 16/958 715/234 |
| 2014/0244407 A1* | 8/2014 | Brown | G06Q 30/0241 705/14.73 |
| 2018/0285940 A1* | 10/2018 | Cazzulani | G06F 16/9577 |

* cited by examiner

IN-FEED FRAME TO DISPLAY ADS OR OTHER EXTERNALLY-HOSTED CONTENT

This application claims priority to U.S. Provisional Patent Application No. 62/094,406 entitled IN-FEED FRAME TO DISPLAY ADS OR OTHER EXTERNALLY-HOSTED CONTENT filed Dec. 19, 2014 which is incorporated herein by reference for all purposes.

BACKGROUND OF THE INVENTION

"Native" advertising refers to techniques to serve ads in a manner that integrates more naturally into the style, layout, and appearance of a page in which the advertisement is displayed. For example, an ad may be displayed in a reserved location within a "newsfeed" style display, in which each of a plurality of articles is represented by a summary, possibly including a representative image, and advertisements may be displayed in the reserved location as "sponsored" or "promoted" content, with the ad comprising a summary of a sponsored article and being formatted so as to fit the look and feel of the rest of the publisher's page. In the approach typically used by advertising providers, however, selection of the ad or other sponsored content by the user results in a link out to a third party web site being activated, with the consequence that the user's attention is pulled away from the publisher's page and site and directed instead to the third party site.

BRIEF DESCRIPTION OF THE DRAWINGS

Various embodiments of the invention are disclosed in the following detailed description and the accompanying drawings.

DETAILED DESCRIPTION

Figure 1:
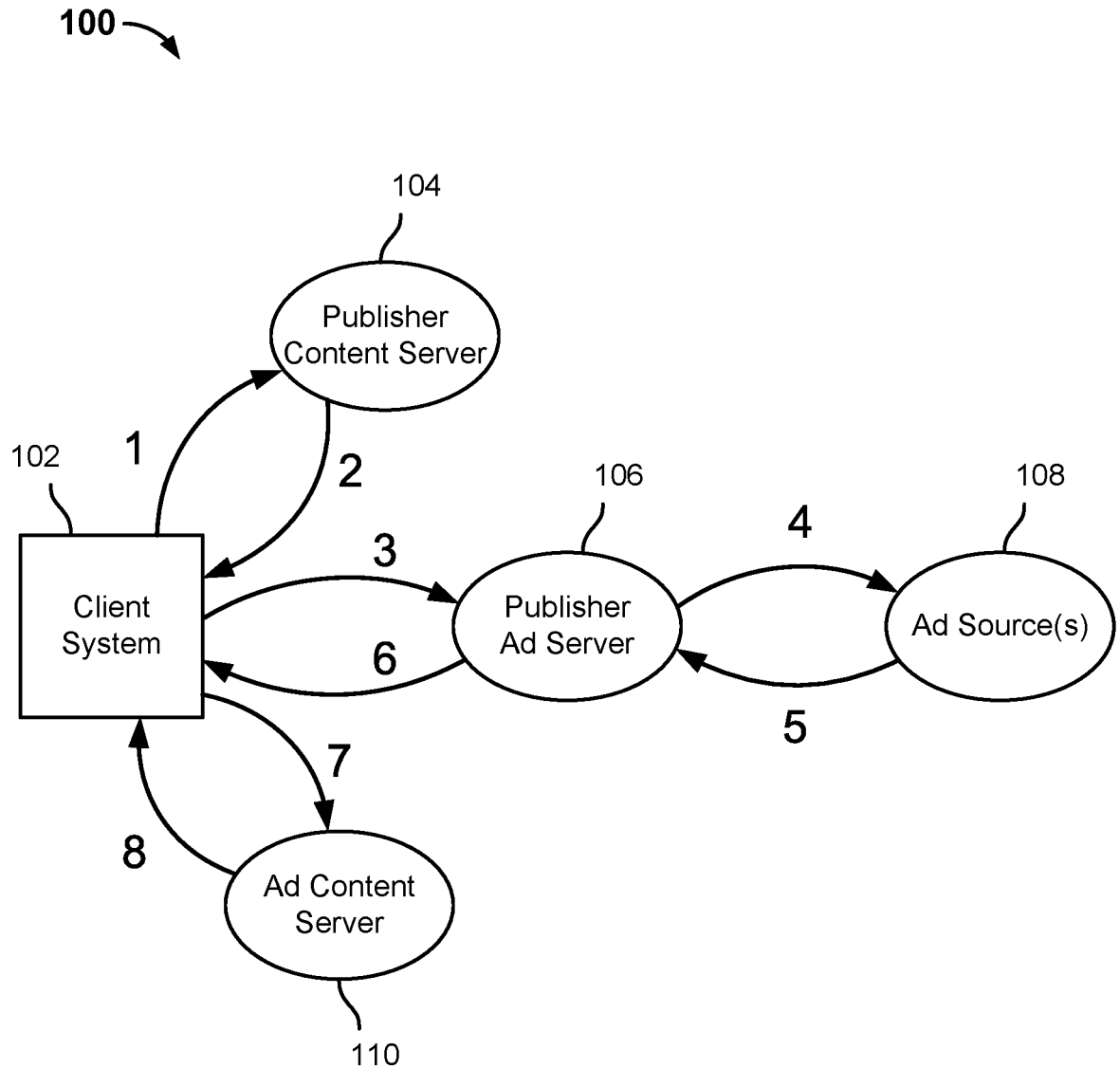
FIG. 1 is a block diagram illustrating an embodiment of a web-based advertising system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatic encapsulation, e.g., within a visual frame or other visible content associated with a page publisher, of third party or other externally-hosted content linked to an ad selected by a user, is disclosed. In various embodiments, external content may be rendered within a publisher "frame" or similar structure, to avoid and/or minimize the sense that a user has navigated away from the publisher's page and associated environment. In various embodiments, use of an automatically generated "frame" as disclosed herein provides a less disruptive user experience for ads that link out to third party web sites. In some embodiments, external content may be pre-fetched, enabling content to be displayed more quickly. In some embodiments, techniques disclosed herein may be used to associate external (e.g., advertising) content with URL and/or domain that is less likely to be detected as a source of ad content by ad blocking software and/or systems.

In various embodiments, use of a frame or other structure to display third party content to which an ad links enables digital advertising performance measurement on third party sites without those sites having to install separate tracking code on their sites. For example, in some embodiments, the frame and/or associated code may include or add instrumentation to the third party page/content, enabling tracking to be performed (e.g., tracking which parts of the third party content the user engages with, how long the user views the content, etc.), without requiring tracking code to be incorporated by the third party, e.g., in the page code as served from their server/site.

FIG. 1 is a block diagram illustrating an embodiment of a web-based advertising system and environment. In the example shown, the advertising system and environment 100 includes a client system 102, such as desktop, laptop, or other computer and/or a smart phone, tablet, or other mobile device, which is used (e.g., using installed browser software) to retrieve a content page, such as a web page, from a publisher's content server 104. The page provided by the publisher's content server 104 in the example shown includes code that calls out to a publisher's ad server 106, e.g., to obtain an ad to display in a prescribed portion of the page provided by content server 104. In some embodiments, the ad may be a "native" ad that is or will be formatted so as to match, to an extent possible, a native look and feel of non-advertising content on the publisher's content page. For example, a magazine or other content publisher may provide a page in which article or other content previews are displayed in a "news feed" type interface. A user may be able to scroll through previews in the newsfeed (or other interface). The content page may be configured such that each preview links to an associated article or other more extensive content. In the case of a native ad, the call to the publisher's ad server 106 may be made to obtain advertising content to be presented in the form of a native ad to be displayed in a prescribed (e.g., pre-reserved, dynamically determined, etc.) position in the newsfeed.

The publisher's ad server 106 may query one or more ad source systems and/or networks 108 to find an ad to be displayed. Examples of ad sources 108 include, without limitation, advertising "supply side" platforms, ad exchanges, and advertising "demand side" platforms (not shown). The publisher's ad server 106 receives and/or selects an ad to be displayed in connection with the content page downloaded to the client system 102 from the publisher's content server 104, and in the typical approach returns to the client system 102 a URL or other identifier of an ad, the content of which is retrieved by client system 102, e.g., from a third party ad content server 110, and displayed in the corresponding location in the content page. In some embodiments, the ad may be served from the ad server 106.

The third party ad retrieved from the ad content server 110 may include a link out to third party content hosted at a site and/or on a domain associated with the third party advertiser or another provider. For example, a native ad may include a link out to further advertising content, such as an article, an image, and/or other content hosted at a third party site, as in the example illustrated in FIG. 2.

Figure 2:
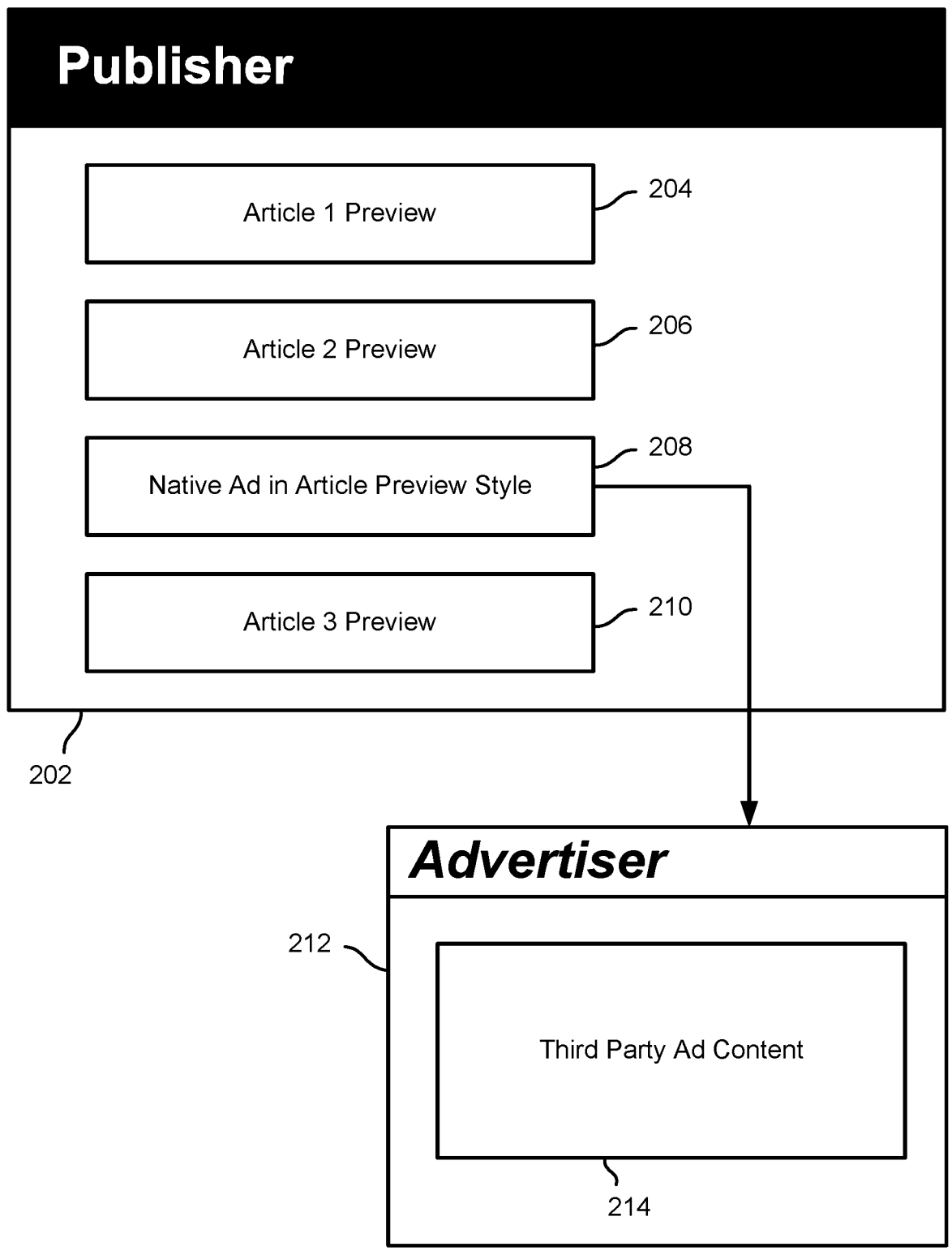
FIG. 2 is a block diagram illustrating an embodiment of a content page that includes a native ad that embodies a link to external content.

FIG. 2 is a block diagram illustrating an embodiment of a content page that includes a native ad that embodies a link to external content. In the example shown, a publisher content page 202, e.g., as rendered a given client system/device, such as client system 102 of FIG. 1, includes four display locations (204, 206, 208, and 210) in a newsfeed interface. In the example shown, the first, second, and fourth locations (204, 206, 210) are used to display previews of non-advertising content of the publisher. The third location in the newsfeed is used to display a native ad 208. The native ad 208 may have the same format, structure, and appearance as article previews 204, 206, and 210, but may be associated with advertising content. For example, advertising content to promote a product may be represented in native ad 208 as a preview of an article about the product. In some embodiments, an indication may be displayed to provide notice to users that a given preview is associated with advertising content.

In the example shown in FIG. 2, selection of the native ad 208 results in the browser software that had been used to display publisher page 202 navigating away from page 202 to a new page 212 provided by the advertiser (in this example) or another third party. The page includes advertising content 214, e.g., an image, article, or other content promoting a product or service.

Linking native ads to third party sites, as in the example shown in FIG. 2, may cause one or more issues. First, users may expect that a click on anything that looks like an article (e.g., the native ad 208 in example shown in FIG. 2) will link them to an article on the same web site they are currently on. If when they click a native ad link they are taken to a third party advertiser site, it's an unexpected result and this often negatively impacts the user's willingness to engage with the advertising content, such as by reading, viewing, or otherwise interacting with the content. They will often "bounce" or leave the third party site without engaging with the content or anything on the site. The second problem is that there is no way for the publisher or other site owner that sold the native ad to track and report user engagement metrics once the user leaves their site. The only way to do so would be to ask the advertiser to place a JavaScript or other method of tracking on their site—this can often be a hassle for the advertiser so they usually only do this with select publishers that they work with.

In the approach disclosed herein, when a native ad links to a third party site, in various embodiments, selection of the native ad by a user results in content from the third party being display in a publisher frame that at least appears to be part of the same publisher's or other originating site. In various embodiments, the approach disclosed herein makes it feel less like the user is leaving the publisher's site and also enables the publisher (or other originating site owner) to retain tracking capabilities.

In various embodiments, tracking capabilities provided via a publisher frame may include one or more of the following: time viewing the third party content as displayed in the publisher frame; scroll behavior; mouse position; clicks/touches on links or controls; and user interaction with interactive elements on the page.

Figure 3:
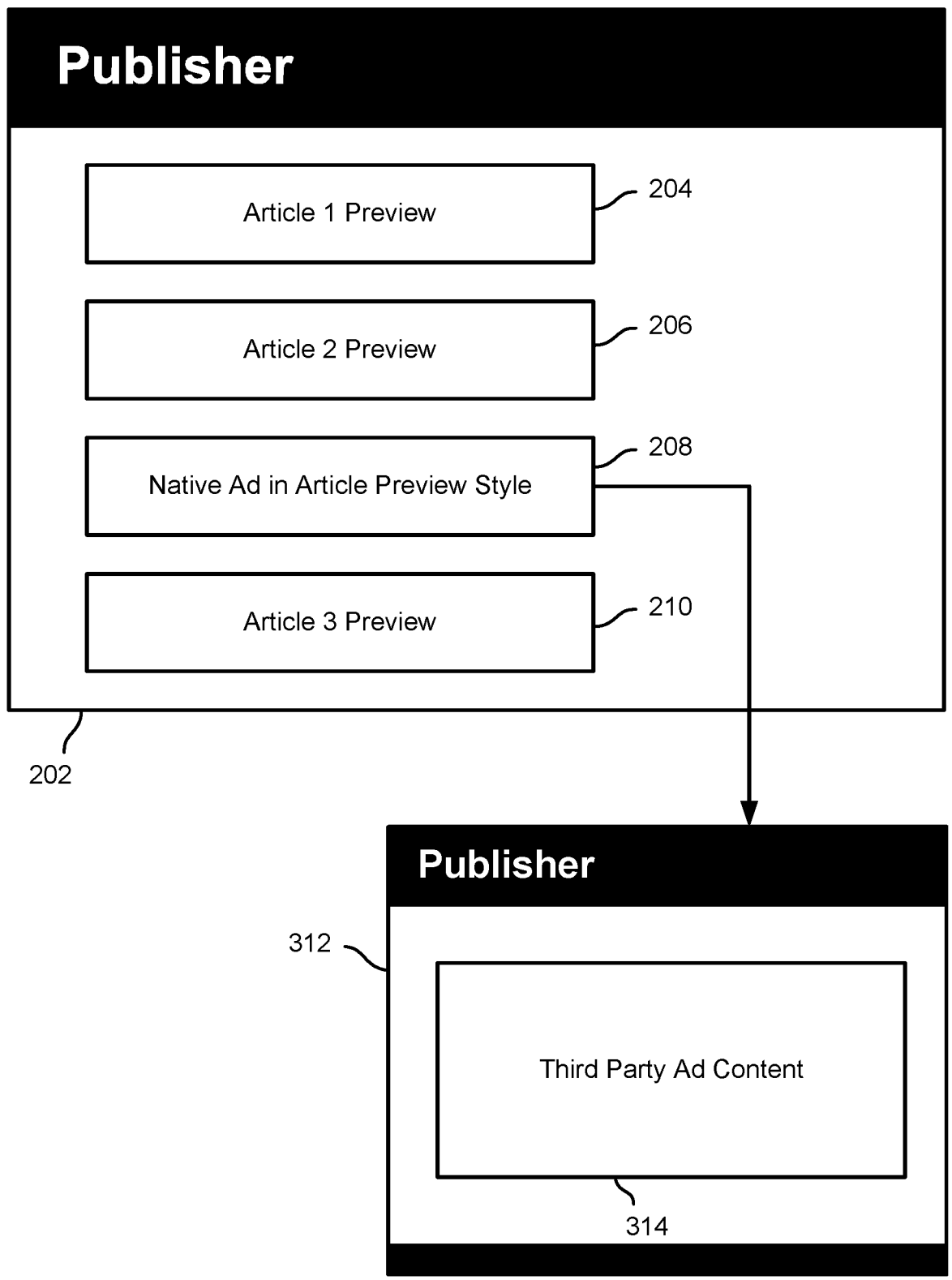
FIG. 3 is a block diagram illustrating an example of a content page that includes a native ad that links to external content, but which has been modified and/or configured to display such external content in a publisher frame or other encapsulation.

FIG. 3 is a block diagram illustrating an example of a content page that includes a native ad that links to external content, but which has been modified and/or configured to display such external content in a publisher frame or other encapsulation. In the example shown, selection of native ad 208 in the context of publisher content page 202 results in third party advertising content 314 being displayed in a publisher frame 312. As used herein, the term "publisher frame" may refer to a visual frame, as shown in FIG. 3, and/or associated tracking code or other resources of the publisher. Any encapsulation that provides a visual and/or functional sense that the user has not navigated away from the publisher's environment may be a "publisher frame" within the meaning of this application. In the example shown in FIG. 3, a top and bottom black border in the same style as the publisher's site (e.g., content page 202), and with the publisher's name at the top, signals to the user that their experience at the publisher's page is continuing. The publisher frame in some embodiments has the same look at feel as frames/pages that launch when content other than ads are selected by the user from a publisher content page, such as articles displayed upon selection of article previews 204, 206, and/or 210 in the example shown in FIG. 2.

In some embodiments, the publisher frame may include a displayed disclaimer indicating that the content is associated with an external provider. For example, in some embodiments, an advertiser with which the content is associated may be determined, e.g., based on a domain or other identifier with which the ad content is associated. In some embodiments, a lookup may be performed to determine the type and/or content of disclaimer to be displayed. Advertisers and associated content may be archived or otherwise tracked, e.g., to facilitate subsequent review and analysis of ads that have run on the site. In some embodiments, a disclaimer may contain content specified and/or configured by the publisher, and may identify the source of the content. By way of example and without limitation, a disclaimer may include content such as, "The displayed content is sponsored content provided by xyz, Inc." In various embodiments, the disclaimer may be displayed in one or more locations, such as in the publisher frame, overlaid over the external content, etc.

In various embodiments, one or both of the publisher content page 202 and/or the native ad 208 may have been modified to link to the third party ad content 314 as framed by the publisher frame 312. In some embodiments, third party ad content 314 may be retrieved dynamically and displayed in publisher frame 312, e.g., in an iframe or other structure that has the same look and feel as the publisher content page 202. In some embodiments, third party ad content 314 may be pre-fetched, in whole or in part, and the publisher frame 312 may be added to the content to create a new page, which is caused to be displayed in the event the native ad 208 is selected. For example, the native ad 208 may be modified "in flight", e.g., on its way to be displayed in the context of content page 202 to link to a dynamically generated page comprising publisher frame 312 and third party ad content 314, e.g., in place of an original link directly to the third party advertiser and/or other third party domain. In some embodiments, code may be provided on publisher content page 202 and/or native ad 208 to intercept clicks on native ad 208 and redirect such clicks to retrieve the third party ad content 314 set in the publisher frame 312.

In various embodiments, external content may not be pre-fetched, maybe partially pre-fetch, and/or may be fully pre-fetched, depending on the preferences of the publisher and/or as determined dynamically, e.g., based on the third party domain with which the content is associated, the nature of the content (video versus text, e.g.), or other considerations.

In some embodiments, a publisher's page on which an in-feed native ad that links out to external content may be included may be pre-ingested. The native ad may be displayed in such a manner that selection of the native ad results in an animation effect to transition to display of the external content in a publisher frame. For example, on selection the native ad could be made to look like it has expanded onto the existing publisher frame that the user is already on, giving the effect that they never left the page. In various embodiments, the foregoing technique may be performed with or without pre-fetching all or part of the external content.

In various embodiments, one or more of the following techniques may be used:

1. No pre-fetch: page wipes clean except for publisher frame and a loading animation is shown.
2. Partial pre-fetch: page wipes clean except for publisher frame and text appears immediately (or nearly so) (e.g., text and HTML may have been pre-fetched), with "loader" widgets shown in place of content that was not pre-fetched, such as video, while such content is retrieved.
3. Full pre-fetch: page wipes clean except for publisher frame and all ad content (e.g., images and text) are displayed without any delay associated with retrieving content.

In some embodiments, one of the above three techniques may be selected dynamically, e.g., based on a user's current connection speed, etc. For example, for a mobile device on a WiFi connection full pre-fetch may be performed, but for a mobile device connected via a 4G wireless network in some embodiments only text and HTML may be pre-fetched, in some embodiments up to a prescribed pre-cache limit. In the case of a slow connection, no pre-fetch may be done. In various embodiments, one or more of the user's past observed behavior, content consumed by the user before, and/or other signals may be used to determine whether and/or an extent to which to pre-fetch. For example, if based on information available a user is predicted to click on a native ad, the associated external content and/or a portion thereof may be pre-fetched. Conversely, for a user who is deemed not likely to click on a given ad, the external content may not be pre-fetched.

In various embodiments, use of a publisher frame as disclosed herein provides the user with a familiar visual reference of the site they were on so they feel less like they have been sent to a third party site. The frame can also house tracking code so that the publisher or site owner can track user activity on the third party site for the purpose of providing advertising performance data to the advertiser. For example, HTML, JavaScript or other tracking code may be included in a header or other location associated with the publisher frame. The frame can also house functions such as sharing bars and a back button. For example, selection of the back button may return the user to the originating publisher's page, further enforcing the sense that the user has never left the publisher's site.

In various embodiments, a publisher frame as described herein may be added to ad content by a participating entity and/or node other than the publisher. For example, an ad provider or intermediary service may add to the third party ad prior to the third party ad being served and rendered on the publisher's site code configured to generate the frame and to retrieve and render the third party site content in the frame upon selection of the ad by a user. In some embodiments, a publisher frame may be generated and used automatically in connection with any native ads that link out to third party sites. For example, in some embodiments, the layout of the publisher site may be read by a native ad service provider during a set up process, and a publisher frame that includes, for example, a colored bar that matches the publisher's site may be generated accordingly. In some embodiments, the publisher logo may be pulled from the publisher's site and applied it to the bar at the top of the publisher frame. In some embodiments, tracking code may be embedded automatically in the publisher frame to enable the publisher and/or a service provider to track the performance of the native ad (or any variation of that ad). In some embodiments, the publisher may be able to further customize the frame.

In some embodiments, a third party content to which a native ad links may be displayed in an inline frame (e.g., an HTML "IFRAME") or other frame. For example, the ad may be modified to cause an inline frame to be opened on selection of the ad. Associated code may use the link associated with the ad to retrieve the third party page. The HTML or other code comprising the page may be parsed to understand its structure and/or content, e.g., to facilitate tracking as disclosed herein. In some embodiments, additional HTML and/or other tags may be injected into the third party page. For example, a new page may be generated dynamically that includes all or part of the structure and content of the third party page and additional tags and/or elements to provide for analytics and/or tracking as disclosed herein. The dynamically generated page may then be rendered in the publisher frame, e.g., an inline frame added dynamically to the publisher page.

Figure 4:
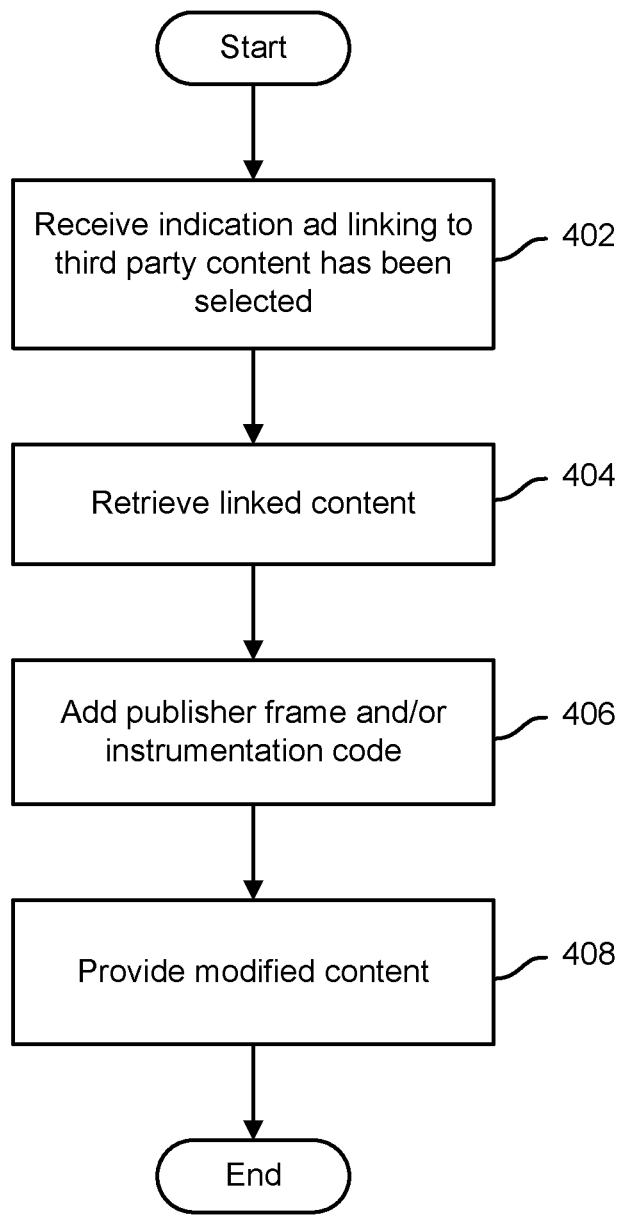
FIG. 4 is a flow chart illustrating an embodiment of a process to display third party content.

FIG. 4 is a flow chart illustrating an embodiment of a process to display third party content. In various embodiments, the process of FIG. 4 may be implemented by a publisher content server, a publisher and/or other ad server, and/or a client system configured by code comprising a publisher page, for example. In the example shown, an indication is received that an ad that links to third party content, such as advertising content, has been selected (402). For example, a click may be detected in a portion of a publisher content page in which the native ad is displayed. The linked content is retrieved (404), and at least a portion of the retrieved content is used to build a modified content, e.g., a modified page, that includes one or both of a publisher frame within which the retrieved content is to be displayed and tracking code to track user engagement with the page (406). The modified content is provided, e.g., displayed (408). For example, the modified content may comprises a modified page that is rendered by a browser that had previously rendered a publisher page in the context of which the ad was selected.

Figure 5:
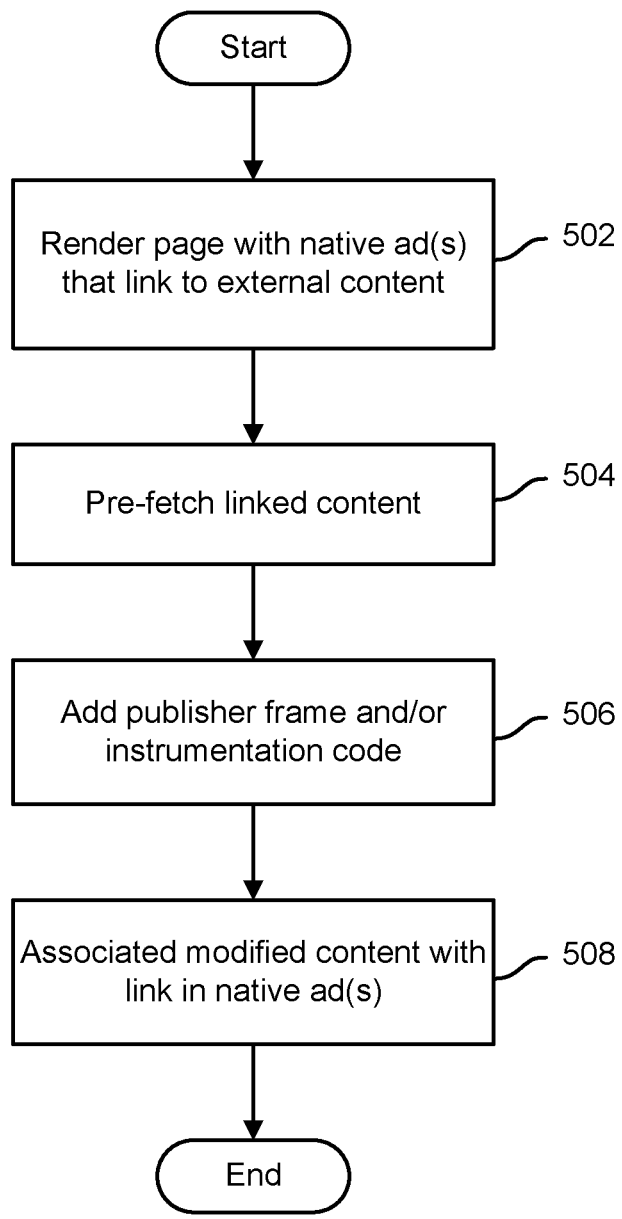
FIG. 5 is a flow chart illustrating an embodiment of a process to associate modified content with a native ad.

FIG. 5 is a flow chart illustrating an embodiment of a process to associate modified content with a native ad. In various embodiments, the process of FIG. 5 may be performed by a publisher ad server. In the example shown, a page that includes one or more native ads that link to external content is rendered (502), e.g., the publisher page 202 of FIG. 3. The external content to which a native ad links is retrieved (504) and a modified content that includes one or both of a publisher frame and/or tracking code is created (506). The modified content is associated with the link in the native ad (508). For example, the link in the native ad may be modified to instead link to the modified version of the linked content. Or, the link may be left unmodified but the publisher page and/or client system may be configured to intercept clicks on the native ad and to redirect such clicks to cause the modified content to be retrieved and displayed.

Figure 6:
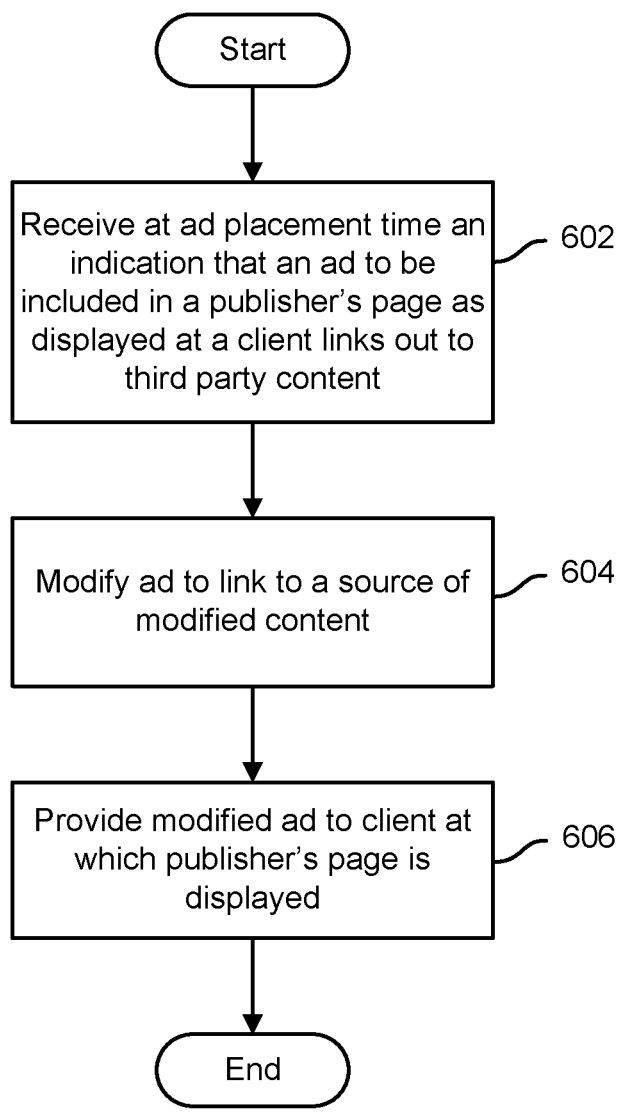
FIG. 6 is a flow chart illustrating an embodiment of a process to modify a native ad to link to modified content.

FIG. 6 is a flow chart illustrating an embodiment of a process to modify a native ad to link to modified content. In various embodiments, the process of FIG. 6 may be implemented by a publisher ad server. In the example shown, at ad placement time (e.g., once an ad has been selected to fulfill an ad request associated with an instance of a publisher content page, e.g., one displayed at a client system or device), an indication is received that an ad to be included in the publisher page as rendered links out to third party content, such as a third party site (602). For example, an ad to fulfill an ad request may be identified, and the associated ad may be retrieved (e.g., by the publisher ad server) and parsed to determine whether the ad links out to a third party site. A modified version of the content to which the ad links may be created, as in the process of FIG. 5, e.g., by retrieving the content to which the ad links out and creating a modified version that includes one or both of a publisher frame and tracking code. The ad is modified to link to the modified version of the linked content (604). For example, a URL or other identifier associated with the publisher's domain may be inserted in place of the original URL to which the native ad links. The modified ad is provided to the client system at which the publisher's page is displayed (606). As a result, selection of the native ad by a user of the client system would cause the modified version of the linked content to be retrieved and displayed.

Figure 7:
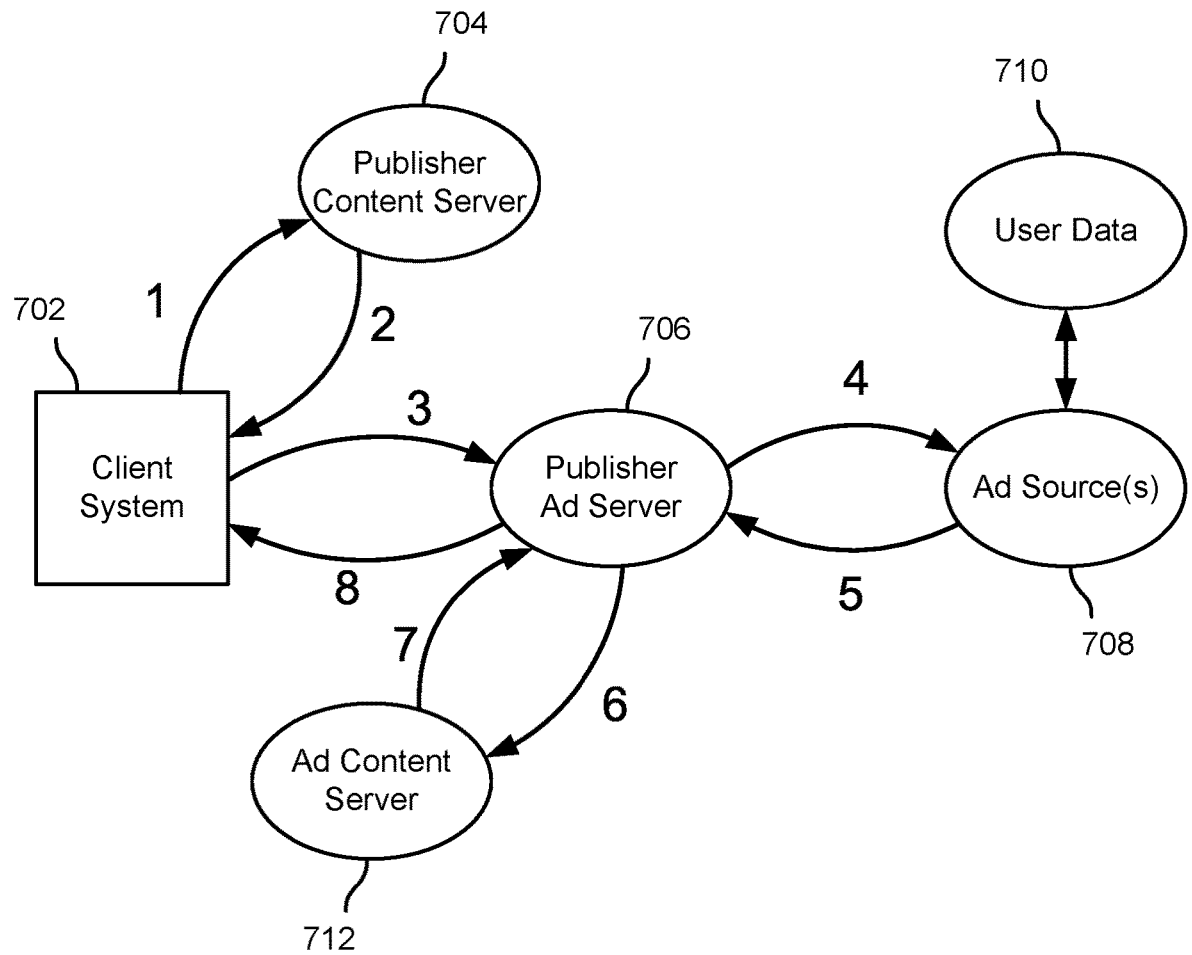
FIG. 7 is a block diagram illustrating an embodiment of a system to prepare modified content to be associated with a native ad.

FIG. 7 is a block diagram illustrating an embodiment of a system to prepare modified content to be associated with a native ad. In the example shown, a client system 702 retrieves a publisher content page from a publisher content server 704. The page results in an ad call being sent to publisher ad server 706. Publisher ad server queries one or more ad sources 708, potentially using user data (or other targeting data) 710 to determine an ad to be displayed in the context of the publisher content page. The publisher ad server retrieves the ad from an ad content server 712, rather than passing back to the client system 702 a link or other identifier associated with the ad. The publisher ad server (or other node) parses the ad to determine whether the ad links out to external content, for example, whether a click on the ad in the context of the publisher page would result in external content, such as a third party page, being retrieved and displayed. If so, in various embodiments, publisher ad server 706 may create a modified version of the content, e.g., a version that includes one or both of a publisher frame and tracking code, and may modify the ad to include a link to the modified version of the linked content. The modified ad and/or a link thereto may then be returned to the client system 702.

In some embodiments, a native or other ad that links to external content associated with a third party domain, such as an ad exchange domain or a third party advertiser domain, may be modified to instead link to a site associated with the publisher's domain. For example, a link out to a URL associated with a "third_party_ad_exchange.com" domain may be changed to a link out to a URL associated with a sub-domain of the publisher's domain, such as "foo.publisher_domain.com". The use of a more publisher-friendly URL may in some cases avoid having a call out intercepted by ad blocking or similar software. In some embodiments, the sub-domain name may be rotated, e.g., randomly and/or on a relatively frequent basis, to keep a step ahead of ad blocking software and/or services, which might otherwise learn over time to associate the sub-domain with advertising content and/or activity.

Figure 8:
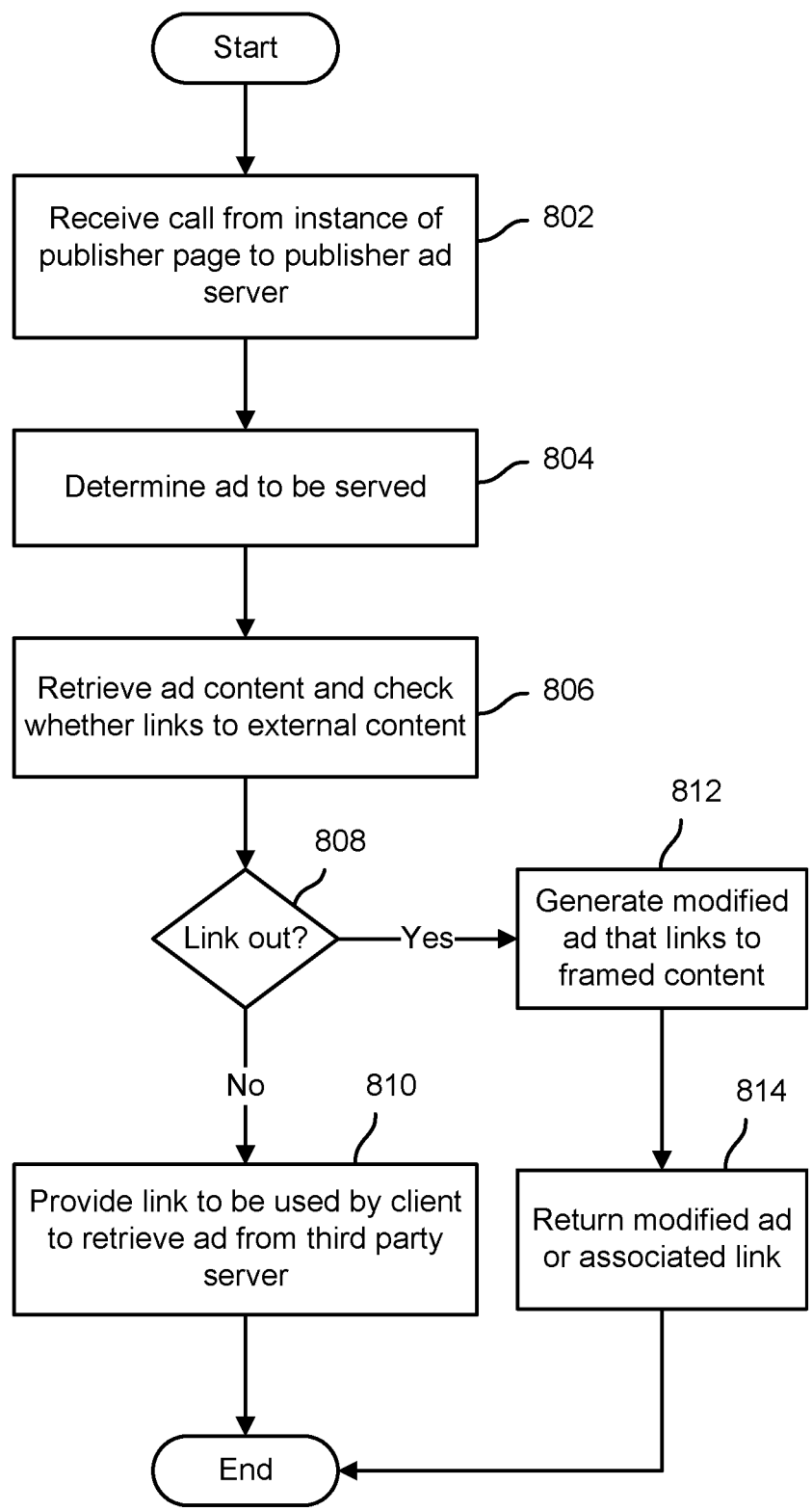
FIG. 8 is a flow chart illustrating an embodiment of a process to dynamically modify native ads to link to modified content.

FIG. 8 is a flow chart illustrating an embodiment of a process to dynamically modify native ads to link to modified content. In various embodiments, the process of FIG. 8 may be performed by a publisher ad server, such as publisher ad server 706 of FIG. 7. In the example shown, an ad call is received from an instance of a publisher content page (802). An ad to be returned is determined (804). The ad content is retrieved, e.g., by the publisher ad server, and checked to determine whether the ad links out to a third party site (806). If the ad does not link out to a third party site (808), a link to be used by the client system to download and render the ad, in the context of the publisher page, is provided in response to the ad call (810). If the ad is determined to link out to a third party site (808), a modified ad that links to a modified version of the linked content, e.g., one that includes one or both of a publisher frame and tracking code, is generated (812) and the modified ad (or a link thereto) is returned (814).

Figure 9:
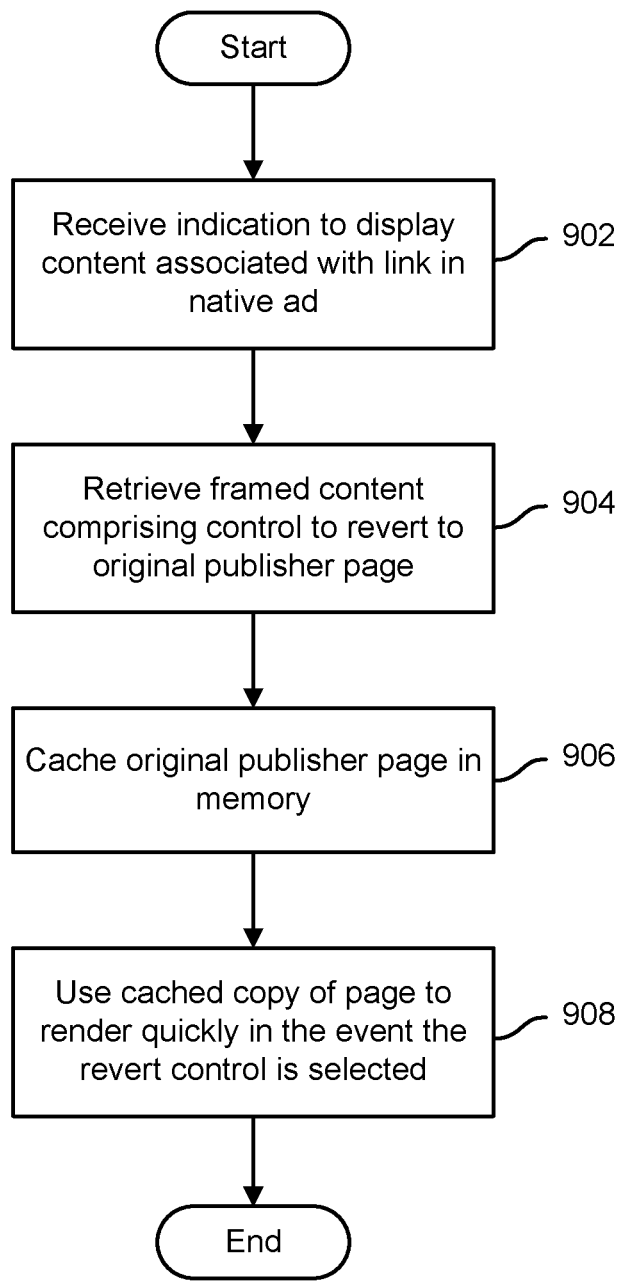
FIG. 9 is a flow chart illustrating an embodiment of a process to display third party content in a frame that facilitates return to a previously-displayed publisher page.

FIG. 9 is a flow chart illustrating an embodiment of a process to display third party content in a frame that facilitates return to a previously-displayed publisher page. In various embodiments, the process of FIG. 9 may be performed by a client system, e.g., by a browser configured by code comprising a publisher page to perform the process of FIG. 9, but a browser plug-in, or other client side code. In some embodiments, all or part of the process of FIG. 9 may be performed by a publisher node, such as a publisher content server or a publisher ad server. In the example shown, an indication to display content associated with a link comprising a native (or other) ad is received (902). For example, a user may have clicked on the native ad as displayed in the context of a publisher content page. A framed version of the linked content is retrieved (904). In various embodiments, the frame may include a user-selectable control to return to the publisher content page in which the native ad was displayed. The original publisher content page is cached in memory (906). The retrieved framed version of the content to which the native ad linked out is displayed, and the cached copy of the original publisher content page is used, in the event the control to return to that page is selected, to render the original content page (908). In various embodiments, use of the technique illustrated in FIG. 9 may enable the original publisher content page to be retrieved and displayed more quickly than if the client system/browser had had to re-request the page from the publisher content server.

Techniques disclosed herein may be used, in various embodiments, to provide a more seamless experience to users and/or to facilitate tracking user engagement with third party content to which native ads may be linked.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving an indication that an ad to be displayed in a context of an instance of a first publisher content page as rendered at a client system links out to advertising content associated with a third party site has been selected, wherein the first publisher content page includes a first publisher frame that provides a corresponding visual border for at least a first portion of the first publisher content page, wherein the first publisher frame identifies a source of the first publisher content page, wherein the ad is displayed within the first publisher frame;
   in response to receiving the indication that the ad has been selected, generating a modified version of the advertising content including by generating a second publisher content page, wherein the advertising content associated with the third party site is displayed in the second publisher content page, wherein the second publisher content page includes a second publisher frame that has a same style as the first publisher frame of the first publisher content page, wherein the second publisher frame provides a corresponding visual border for at least a second portion of the second publisher content page, wherein the second publisher frame identifies the source of the first publisher content page as the source of the second publisher content page, wherein the advertising content associated with the third party site is displayed within the second publisher frame; and
   providing the modified version of the advertising content to the client system.

2. The method of claim 1, wherein the ad is modified to link to the modified version of the advertising content.

3. The method of claim 1, wherein generating the modified version of the advertising content includes retrieving the advertising content from the third party site.

4. The method of claim 1, wherein the second publisher frame comprises an iframe.

5. The method of claim 1, wherein the second publisher frame includes visual elements associated with the first publisher content page.

6. The method of claim 1, wherein the second publisher frame includes a control to return to the first publisher content page.

7. The method of claim 1, wherein generating the modified version of the advertising content includes adding tracking code to the second publisher content page comprising the modified version of the advertising content.

8. The method of claim 1, wherein generating the modified version of the advertising content includes associating the modified version of the advertising content with a domain not associated with the third party site.

9. The method of claim 1, wherein the modified version of the advertising content includes a visual element associating the modified version of the advertising content with a publisher.

10. The method of claim 9, wherein the modified version of the advertising content includes a displayed disclaimer content that identifies the third party site as a source of the advertising content.

11. The method of claim 1, further comprising pre-fetching all, a portion of, or none of the advertising content, based at least in part on a configured preference of a publisher.

12. The method of claim 1, further comprising pre-fetching all, a portion of, or none of the advertising content, based at least in part on a dynamically determined attribute of a connection used by the client system to retrieve the second publisher content page.

13. The method of claim 1, further comprising pre-fetching and pre-staging linked advertising content at the client system up to a configured limit.

14. The method of claim 1, further comprising pre-ingesting the first publisher content page and configure the client system to display an animated transition from the ad as rendered within the first publisher content page to the modified version of the advertising content upon selection of the ad.

15. The method of claim 1, wherein receiving said indication that the ad links out to advertising content associated with the third party site includes retrieving the ad and determining based at least in part on content comprising the ad that the ad links out to advertising content associated with a third party site.

16. The method of claim 1, wherein the second publisher frame includes tracking code to enable the source of the second publisher content page to track user activity.

17. The method of claim 16, wherein the tracking code is included in a header of the second publisher content page.

18. The method of claim 16, wherein the source of the second publisher content page provides the tracked user activity to a source associated with the advertising content.

19. The method of claim 1, wherein comprising pre-fetching some or all of the advertising content associated with the third party site, based at least in part on a configured preference of a publisher associated with the third party site.

20. The method of claim 1, wherein generating the modified version of the advertising content includes:
   retrieving the advertising content associated with the third party site; and
   building the second publisher content page to include the second publisher frame, tracking code within the second publisher frame to enable the source of the second publisher content page to track user activity, and the retrieved advertising content associated with the third party site within the second publisher frame.

21. The method of claim 1, wherein the modified version of the advertising content is rendered by a browser associated with the client system.

22. The method of claim 1, wherein generating the modified version of the advertising content includes inserting a uniform resource locator (URL) associated with the source of the first publisher content page in place of a URL associated with the third party site.

23. A system, comprising:
   a communication interface; and a processor coupled to the communication interface and configured to:
   receive an indication that an ad to be displayed in a context of an instance of a first publisher content page as rendered at a client system links out to advertising content associated with a third party site has been selected, wherein the first publisher content page includes a first publisher frame that provides a corresponding visual border for at least a first portion of the first publisher content page, wherein the first publisher frame identifies a source of the first publisher content page, wherein the ad is displayed within the first publisher frame;
   in response to receiving the indication that the ad has been selected, via a communication sent via the communication interface, generate a modified version of the advertising content including by generating a second publisher content page, wherein the advertising content associated with the third party site is displayed in the second publisher content page, wherein the second publisher content page includes a second publisher frame that has a same style as the first publisher frame of the first publisher content page, wherein the second publisher frame provides a corresponding visual border for at least a second portion of the second publisher content page, wherein the second publisher frame identifies the source of the first publisher content page as the source of the second publisher content page, wherein the advertising content associated with the third party site is displayed within the second publisher frame; and
   provide, via the communication interface to the client system, the modified version of the advertising content.

24. The system of claim 23, wherein the ad is modified to link to the modified version of the advertising content.

25. A computer program product embodied in a non-transitory computer readable storage medium and comprising computer instructions for:
   receiving an indication that an ad to be displayed in a context of an instance of a first publisher content page as rendered at a client system links out to advertising content associated with a third party site has been selected, wherein the first publisher content page includes a first publisher frame that provides a corresponding visual border for at least a first portion of the first publisher content page, wherein the first publisher frame identifies a source of the first publisher content page, wherein the ad is displayed within the first publisher frame;
   in response to receiving the indication that the ad has been selected, generating a modified version of the advertising content including by generating a second publisher content page, wherein the advertising content associated with the third party site is displayed in the second publisher content page, wherein the second publisher content page includes a second publisher frame that has a same style as the first publisher frame of the first publisher content page, wherein the second publisher frame provides a corresponding visual border for at least a second portion of the second publisher content page, wherein the second publisher frame identifies the source of the first publisher content page as the source of second publisher content page, wherein the advertising content associated with the third party site is displayed within the second publisher frame; and
   providing the modified version of the advertising content to the client system.

\* \* \* \* \*